United States Patent [19]
McKibben

[11] Patent Number: 5,448,589
[45] Date of Patent: Sep. 5, 1995

[54] CIRCUIT FOR SENSING CABLE EFFECTS FOR AUTOMATIC EQUALIZATION

[75] Inventor: Barry A. McKibben, Beaverton, Oreg.

[73] Assignee: Tektronix, Inc., Wilsonville, Oreg.

[21] Appl. No.: 283,413

[22] Filed: Aug. 1, 1994

[51] Int. Cl.6 .............................................. H04B 3/14
[52] U.S. Cl. .................................. 375/230; 333/18; 330/304
[58] Field of Search .................................. 375/11–12; 333/18, 28 R, 28 T; 330/304; 364/732–734

[56] References Cited

U.S. PATENT DOCUMENTS

| | | | |
|---|---|---|---|
| 3,671,886 | 6/1972 | Fudemoto et al. | 333/18 |
| 4,243,956 | 1/1981 | Lemoussu et al. | 333/18 |
| 4,565,974 | 1/1986 | Smoot | 330/304 |
| 4,592,068 | 3/1986 | Jessop et al. | 375/11 |

*Primary Examiner*—Young Tse
*Attorney, Agent, or Firm*—Francis I. Gray

[57] ABSTRACT

An automatic equalizer has a circuit for sensing cable effects that generates a control signal for a variable equalizer. A digital signal from a transmission channel is input to the variable equalizer to produce an equalized digital signal as a function of the control signal. The equalized digital signal is input to the sensing circuit which detects over-shoot or under-shoot of transitions in the equalized digital signal and adjusts the control signal accordingly to produce a balance in the transitions.

27 Claims, 3 Drawing Sheets

CIRCUIT FOR SENSING CABLE EFFECTS FOR AUTOMATIC EQUALIZATION

BACKGROUND OF THE INVENTION

The present invention relates to equalization of transmission channels, and more particularly to a circuit for sensing cable effects to the determine the amount of equalization required for automatic equalization.

Equalization of transmission channels, often simply wire cables, is common in the field of data communication. The desired effect of equalization is to compensate for the high frequency loss of the cable so that the received waveform more closely resembles the transmitted waveform. This equalization reduces phase and amplitude distortions which otherwise can cause transmission errors. Fixed equalization may be used when the cable type and length are constant and known. Adjustable equalization may be used to manually accommodate differing cable lengths. Automatic equalizers determine the required equalization from the characteristics of the received signal, and then vary the applied equalization accordingly.

Various sensing schemes are currently used in automatic equalizers. Some methods require transmission of a training sequence, i.e., a known signal from which the receiver can derive an optimum equalization filter response. Another method senses the amplitude of the received signal and applies equalization to restore the signal to an assumed initial amplitude. Both of these methods put certain requirements on the transmitted signal, either that it contain the training sequence or that it always have an accurately fixed amplitude at launch.

What is needed is a method for sensing the required equalization for automatic equalization without the requirement of training signals or fixed amplitude signals.

SUMMARY OF THE INVENTION

Accordingly the present invention provides a circuit for sensing cable effects for automatic equalization for a class of signals that has equal magnitude, rectangular pulses which have roll-off at the leading edges due to transmission over a channel. A variable equalizer is used at the receiver to match the cable type, the equalizer having a transfer function that closely approximates the inverse of the channel's transfer function. The equalizer receives the transmitted signals and provides an equalized waveform. A sensing circuit detects roll-off or over-shoot on the equalized waveform from the equalizer and provides feedback to the equalizer control to increase or decrease the applied equalization to minimize the detected aberration. The sensing circuit amplifies the equalized waveform with an automatic gain control circuit, converts the waveform to an absolute value waveform, and then differentiates the absolute value waveform. The differentiated waveform has peaks, the amplitudes of which in the positive and negative directions represent over-shoot or under-shoot in the equalized waveform. A limiter clips either the positive or negative peaks, and the clipped waveform is integrated to produce a control voltage that determines the equalizer transfer function.

The objects, advantages and other novel features of the present invention are apparent from the following detailed description when read in conjunction with the appended claims and attached drawing.

DESCRIPTION OF THE PREFERRED EMBODIMENT

Figure 1:
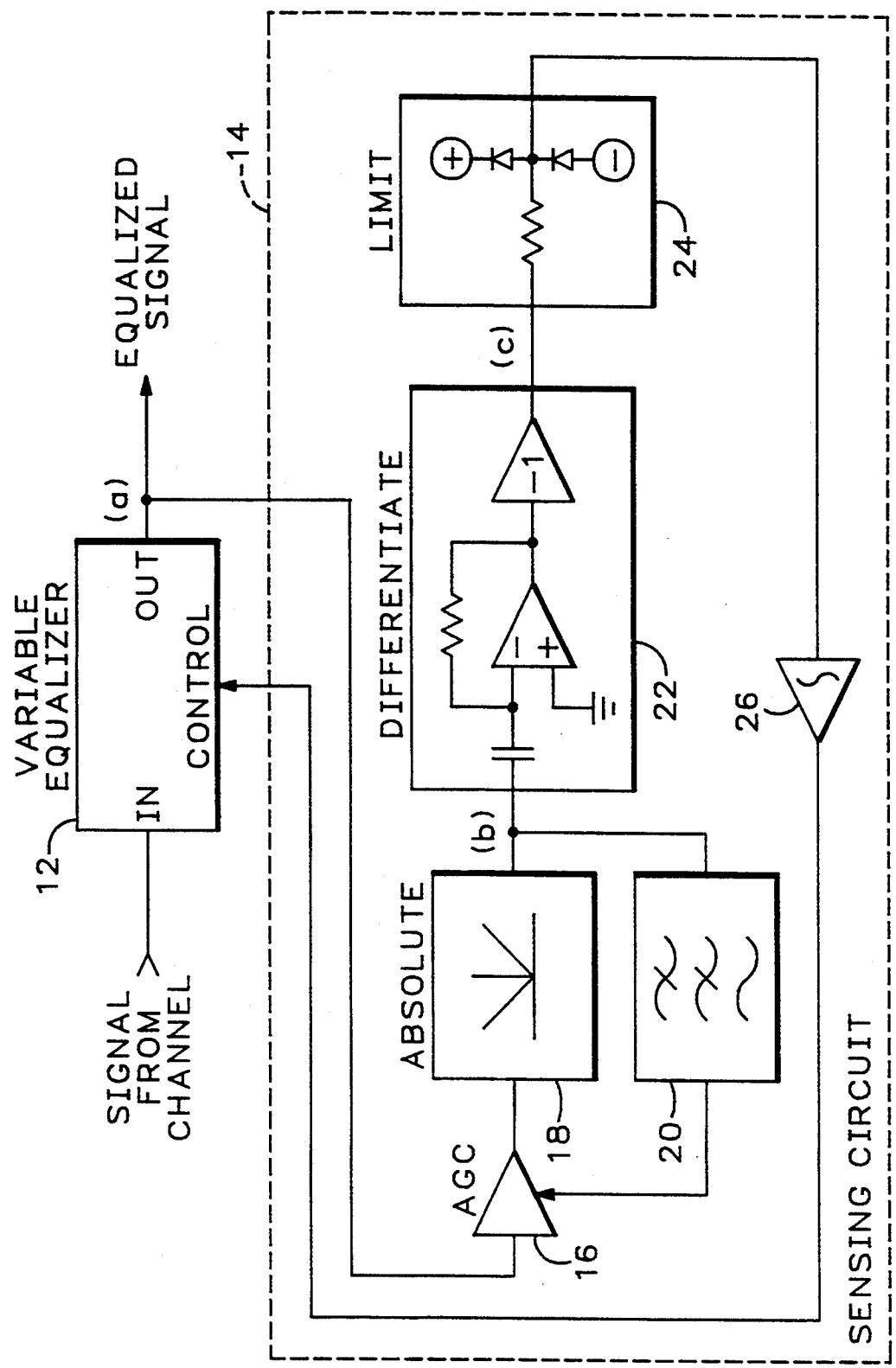
FIG. 1 is a block/schematic diagram of a sensing circuit according to the present invention.
Figure 2:
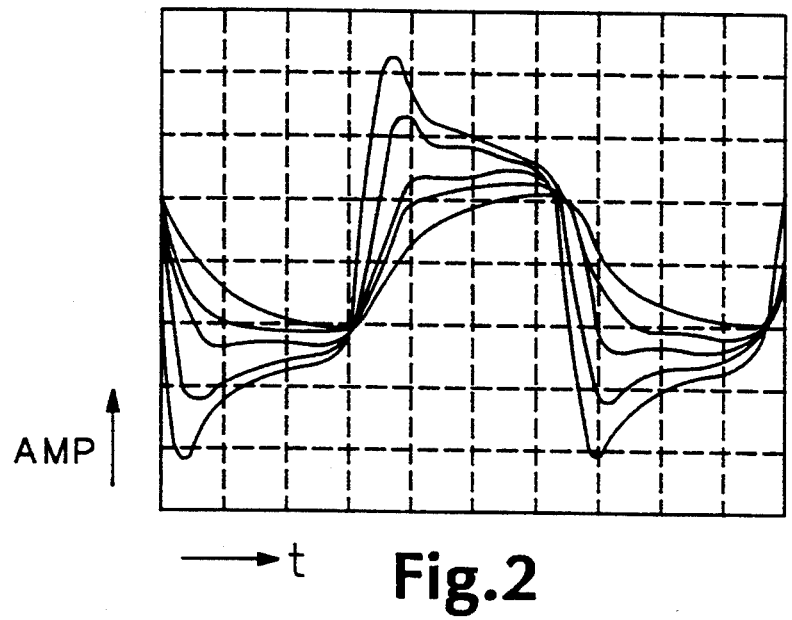
FIG. 2 is a pictorial diagram illustrating a range of equalizer responses.

Referring now to FIG. 1 a transmitted digital signal having constant amplitude and rectangular pulses at launch is coupled from a cable, or transmission channel, to the input of a variable equalizer 12, such as that described by Yoshitaka Takasaki in an article in IEEE Transactions on Communications, Vol. COM-26, No. 5, May 1978, entitled "Simple Inductorless Automatic Line Equalizer for PCM Transmission Using New Variable Transfer Function", incorporated herein by reference. The variable equalizer 12 provides an equalized signal at an output in response to a control signal applied to a control port. The equalized signal from the variable equalizer 12 is input to a sensing circuit 14 that generates the control signal as a function of the characteristics of the equalized signal. The range of responses for the variable equalizer 12 is illustrated graphically in FIG. 2.

The equalized signal from the equalizer 12 is amplified by an automatic gain control (AGC) circuit 16 which in turn drives an absolute value circuit 18. The absolute value circuit 18 has gain G for positive inputs and gain -G for negative inputs. The output of the absolute value circuit 18 is input to a lowpass filter 20, the output of which supplies a gain control voltage for the AGC circuit 16. The AGC circuit 16, absolute value circuit 18 and lowpass filter 20 serve to maintain a constant average voltage at the output of the absolute value circuit over a wide range of wave shapes and signal amplitudes. The output from the absolute value circuit 18 passes through a differentiator 22, the output of which is proportional to the slope of its input signal. The positive and negative peaks of the output from the differentiator 22 are clipped by a limiter 24 to specified plus and minus voltages. The resulting signal from the limiter 24 is input to an integrator or lowpass filter 26 to create the control signal for the variable equalizer 12.

Figure 3:
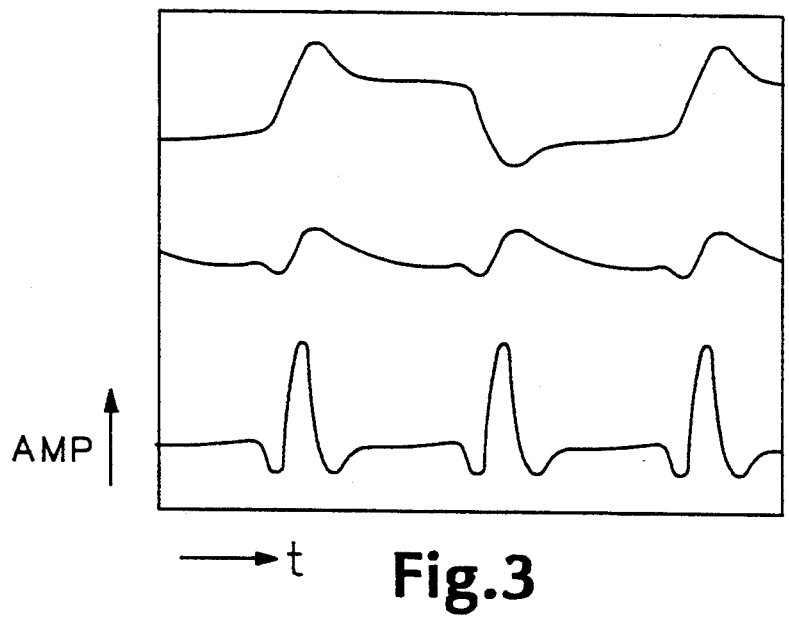
FIG. 3 is a pictorial diagram illustrating an over-equalized waveform.

In operation when the control signal from the integrator 26 is too large, it causes over-equalization of a signal applied to the input of the variable equalizer 12, as shown in FIG. 3 waveform (a), i.e., the equalized signal has overshoot. The absolute value of this waveform is shown in FIG. 3 waveform (b). The steeply rising part of the waveform (b) results in a large positive peak from the differentiator 22, as shown in FIG. 3 waveform (c). Since the output from the differentiator 22 is free of DC, the clipping of this positive peak by the limiter 24 causes the average input to the integrator 26 to be slightly negative. This negative input forces the control voltage at the output of the integrator 26 down, reducing the overshoot.

Figure 4:
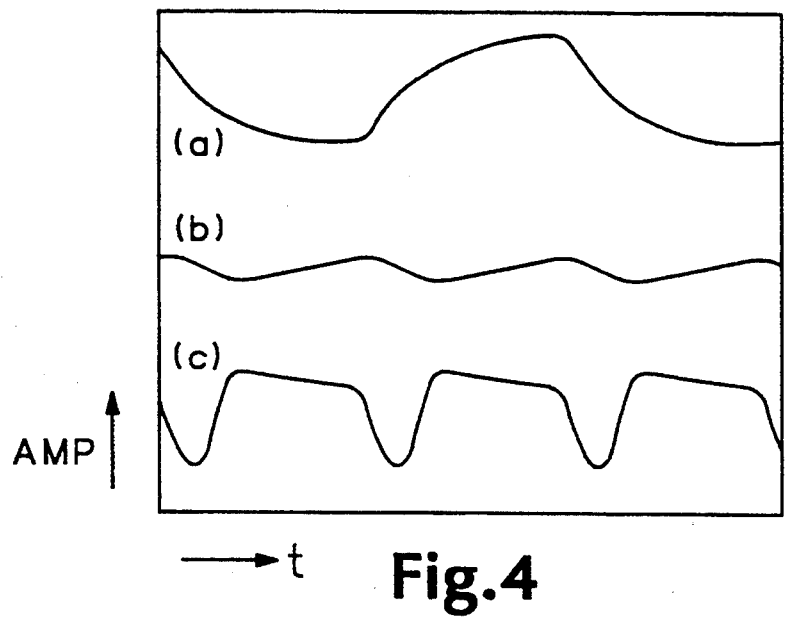
FIG. 4 is a pictorial diagram illustrating an under-equalized waveform.

If the equalized signal is initially under-equalized, as shown in FIG. 4 waveform (a), then the input to the absolute value circuit 18 is initially rolled off as shown in FIG. 4 waveform (b). This waveform then has a negative transition that is steeper than the positive transition, resulting in a large negative peak from the differentiator 22, as shown in FIG. 4 waveform (c). When this negative peak is clipped by the limiter 24, the positive net input to the integrator 26 increases the control voltage for the variable equalizer 12, reducing the undershoot.

Figure 5:
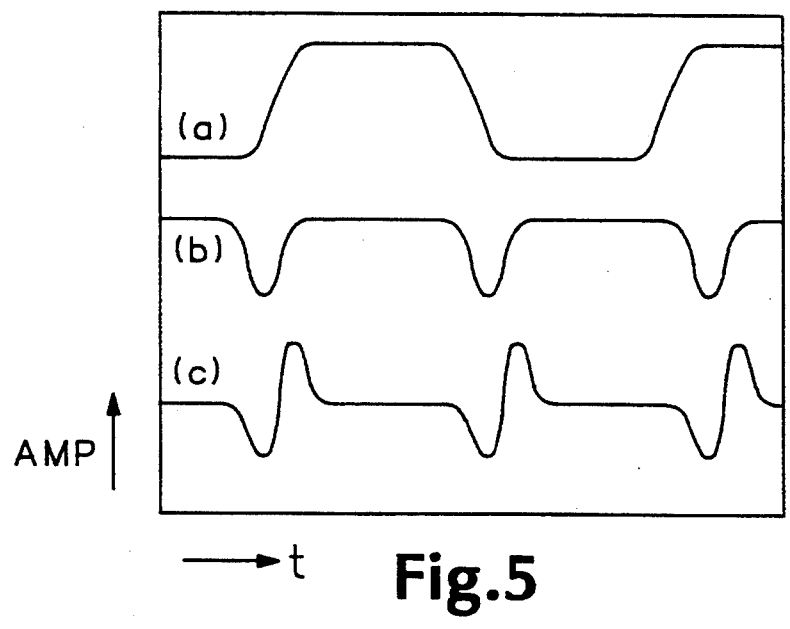
FIG. 5 is a pictorial diagram illustrating an automatic equalizer in balance.

A balance is reached when the transitions in the equalized signal from the variable equalizer 12 are symmetrical about the 50% point, as shown in FIG. 5 waveform (a), making equal rising and falling slopes from the absolute value circuit 18, as shown in FIG. 5 waveform (b), thus giving equal positive and negative peaks after the differentiator 22, as shown in FIG. 5 waveform (c). The amplitude set by the AGC circuit 16 is chosen so that, when balanced, the positive and negative peaks from the differentiator 22 are both partially clipped by the limiter 24. This ensures that any deviation from balance results in a net DC level to the integrator 26 of the correct polarity to restore balance.

Thus the present invention provides a sensing circuit for cable effects for automatic equalization by examining the edges of the equalized signal from a variable equalizer for over-shoot or under-shoot, and generating an appropriate control signal for the variable equalizer to achieve balance.

What is claimed is:

1. An automatic equalizer comprising:
   a variable equalizer having an input port to receive a digital signal from a transmission channel, an output port to provide an equalized digital signal, and a control port to which is applied a control signal that controls an equalization function for the variable equalizer; and
   a sensing circuit having an input port to receive the equalized digital signal and an output port to provide the control signal, the sensing circuit detecting under-shoot or over-shoot of transitions in the equalized digital signal and varying the control signal accordingly.

2. The automatic equalizer as recited in claim 1 wherein the sensing circuit comprises:
   means for modifying the equalized digital signal at the input port to an absolute value signal having a constant average voltage;
   means for generating from the absolute value signal a slope signal that is proportional to the slope of the absolute value signal; and
   means for convening the slope signal to the control signal.

3. The automatic equalizer as recited in claim 2 wherein the modifying means comprises:
   an automatic gain control circuit having the equalized digital signal as an input, the gain of the automatic gain control circuit being controlled by a gain control voltage;
   an absolute value circuit coupled to an output of the automatic gain control circuit for converting the equalized digital signal output from the automatic gain control circuit to the absolute value signal; and
   a lowpass filter having the absolute value signal as an input and providing the gain control voltage as an output.

4. The automatic equalizer circuit as recited in claim 3 wherein the generating means comprises a differentiator circuit having the absolute value signal as an input and providing a differentiated absolute value signal as an output, the differentiated absolute value signal being the slope signal.

5. The automatic equalizer circuit as recited in claim 4 wherein the converting means comprises:
   a limiter circuit having the slope signal as an input and providing a clipped slope signal as an output, the limiter circuit clipping either positive or negative peaks in the slope signal representing overshoot or under-shoot; and
   means for integrating the clipped slope signal to produce the control signal.

6. The automatic equalizer as recited in claim 5 wherein the integrating means comprises an integrating circuit having the clipped slope signal as an input and the control signal as an output.

7. The automatic equalizer as recited in claim 5 wherein the integrating means comprises a lowpass filter having the clipped slope signal as an input and the control signal as an output.

8. The automatic equalizer circuit as recited in claim 3 wherein the converting means comprises:
   a limiter circuit having the slope signal as an input and providing a clipped slope signal as an output, the limiter circuit clipping either positive or negative peaks in the slope signal representing overshoot or under-shoot; and
   means for integrating the clipped slope signal to produce the control signal.

9. The automatic equalizer as recited in claim 8 wherein the integrating means comprises an integrating circuit having the clipped slope signal as an input and the control signal as an output.

10. The automatic equalizer as recited in claim 8 wherein the integrating means comprises a lowpass filter having the clipped slope signal as an input and the control signal as an output.

11. The automatic equalizer circuit as recited in claim 8 wherein the generating means comprises a differentiator circuit having the absolute value signal as an input and providing a differentiated absolute value signal as an output, the differentiated absolute value signal being the slope signal.

12. The automatic equalizer circuit as recited in claim 2 wherein the generating means comprises a differentiator circuit having the absolute value signal as an input and providing a differentiated absolute value signal as an output, the differentiated absolute value signal being the slope signal.

13. The automatic equalizer as recited in claim 12 wherein the modifying means comprises:
   an automatic gain control circuit having the equalized digital signal as an input, the gain of the automatic gain control circuit being controlled by a gain control voltage;
   an absolute value circuit coupled to an output of the automatic gain control circuit for converting the equalized digital signal output from the automatic gain control circuit to the absolute value signal; and
   a lowpass filter having the absolute value signal as an input and providing the gain control voltage as an output.

14. The automatic equalizer circuit as recited in claim 13 wherein the converting means comprises:

a limiter circuit having the slope signal as an input and providing a clipped slope signal as an output, the limiter circuit clipping either positive or negative peaks in the slope signal representing over-shoot or under-shoot; and means for integrating the clipped slope signal to produce the control signal.

15. The automatic equalizer as recited in claim 14 wherein the integrating means comprises an integrating circuit having the clipped slope signal as an input and the control signal as an output.

16. The automatic equalizer as recited in claim 14 wherein the integrating means comprises a lowpass filter having the clipped slope signal as an input and the control signal as an output.

17. The automatic equalizer circuit as recited in claim 12 wherein the converting means comprises:

a limiter circuit having the slope signal as an input and providing a clipped slope signal as an output, the limiter circuit clipping either positive or negative peaks in the slope signal representing over-shoot or under-shoot; and means for integrating the clipped slope signal to produce the control signal.

18. The automatic equalizer as recited in claim 17 wherein the integrating means comprises an integrating circuit having the clipped slope signal as an input and the control signal as an output.

19. The automatic equalizer as recited in claim 17 wherein the integrating means comprises a lowpass filter having the clipped slope signal as an input and the control signal as an output.

20. The automatic equalizer as recited in claim 17 wherein the modifying means comprises:

an automatic gain control circuit having the equalized digital signal as an input, the gain of the automatic gain control circuit being controlled by a gain control voltage;

an absolute value circuit coupled to an output of the automatic gain control circuit for converting the equalized digital signal output from the automatic gain control circuit to the absolute value signal; and a lowpass filter having the absolute value signal as an input and providing the gain control voltage as an output.

21. The automatic equalizer circuit as recited in claim 2 wherein the converting means comprises:

a limiter circuit having the slope signal as an input and providing a clipped slope signal as an output, the limiter circuit clipping either positive or negative peaks in the slope signal representing over-shoot or under-shoot; and means for integrating the clipped slope signal to produce the control signal.

22. The automatic equalizer as recited in claim 21 wherein the integrating means comprises an integrating circuit having the clipped slope signal as an input and the control signal as an output.

23. The automatic equalizer as recited in claim 21 wherein the integrating means comprises a lowpass filter having the clipped slope signal as an input and the control signal as an output.

24. The automatic equalizer as recited in claim 21 wherein the modifying means comprises:

an automatic gain control circuit having the equalized digital signal as an input, the gain of the automatic gain control circuit being controlled by a gain control voltage;

an absolute value circuit coupled to an output of the automatic gain control circuit for converting the equalized digital signal output from the automatic gain control circuit to the absolute value signal; and a lowpass filter having the absolute value signal as an input and providing the gain control voltage as an output.

25. The automatic equalizer circuit as recited in claim 24 wherein the generating means comprises a differentiator circuit having the absolute value signal as an input and providing a differentiated absolute value signal as an output, the differentiated absolute value signal being the slope signal.

26. The automatic equalizer circuit as recited in claim 21 wherein the generating means comprises a differentiator circuit having the absolute value signal as an input and providing a differentiated absolute value signal as an output, the differentiated absolute value signal being the slope signal.

27. The automatic equalizer as recited in claim 26 wherein the modifying means comprises:

an automatic gain control circuit having the equalized digital signal as an input, the gain of the automatic gain control circuit being controlled by a gain control voltage;

an absolute value circuit coupled to an output of the automatic gain control circuit for convening the equalized digital signal output from the automatic gain control circuit to the absolute value signal; and a lowpass filter having the absolute value signal as an input and providing the gain control voltage as an output.

* * * * *